(12) United States Patent
Shimada et al.

(10) Patent No.: US 8,146,340 B2
(45) Date of Patent: Apr. 3, 2012

(54) LINK CHAIN

(75) Inventors: Yoshihiro Shimada, Kaga (JP); Nobuyuki Matsui, Kaga (JP)

(73) Assignee: Daido Kogyo Co., Ltd., Kaga, Ishikawa Pref. (JP)

( * ) Notice: Subject to any disclaimer, the term of this patent is extended or adjusted under 35 U.S.C. 154(b) by 76 days.

(21) Appl. No.: 12/680,397

(22) PCT Filed: Sep. 27, 2007

(86) PCT No.: PCT/JP2007/068825
§ 371 (c)(1),
(2), (4) Date: Mar. 26, 2010

(87) PCT Pub. No.: WO2009/040915
PCT Pub. Date: Apr. 2, 2009

(65) Prior Publication Data
US 2010/0307128 A1 Dec. 9, 2010

(51) Int. Cl.
*F16G 13/08* (2006.01)
*F16H 7/06* (2006.01)
*B21L 9/04* (2006.01)

(52) U.S. Cl. .............. 59/5; 59/8; 59/29; 59/35.1; 59/78; 474/206; 474/207; 474/212

(58) Field of Classification Search ................ 59/5, 8, 59/29, 30, 35.1, 78; 474/206, 207, 212, 217
See application file for complete search history.

(56) References Cited

U.S. PATENT DOCUMENTS

| | | | |
|---|---|---|---|
| 3,912,551 A | 10/1975 | Araya | |
| 5,803,852 A * | 9/1998 | Agostinelli et al. | 474/161 |
| 6,068,568 A * | 5/2000 | Kozakura et al. | 474/212 |
| 6,607,850 B2 * | 8/2003 | Wang et al. | 59/901 |
| 6,666,013 B2 * | 12/2003 | Nakagawa et al. | 59/5 |
| 7,201,687 B2 * | 4/2007 | Mott et al. | 59/88 |
| 7,490,715 B2 * | 2/2009 | Girg et al. | 59/5 |
| 7,546,725 B2 * | 6/2009 | Shimaya et al. | 59/35.1 |
| 7,572,200 B2 * | 8/2009 | Murata et al. | 474/202 |
| 7,771,304 B2 * | 8/2010 | Ogo et al. | 474/213 |

FOREIGN PATENT DOCUMENTS

| | | |
|---|---|---|
| GB | 952207 | 3/1964 |
| GB | 2310474 | 8/1997 |
| JP | 7-151192 | 6/1995 |
| JP | 9-269035 | 10/1997 |
| JP | 2000-249196 | 9/2000 |
| JP | 2000-249198 | 9/2000 |
| JP | 2002-250405 | 9/2002 |
| JP | 2005-281788 | 10/2005 |
| JP | 2005-351369 | 12/2005 |

* cited by examiner

*Primary Examiner* — David B Jones
(74) *Attorney, Agent, or Firm* — Jordan and Hamburg LLP (57) ABSTRACT

A bush is pressed into a link plate in a turning link rank that turns relatively with a pin. The bush is molded into a seamless cylindrical shape by cold-forging and is coated with a metal carbide layer formed by cementation of chrome, vanadium and other metals and having Vickers hardness of 1300 Hv or more similarly to the pin. Afterwards, the bush is treated by a quenching, tempering or isothermal transformation process. Thereby, wear resistance of the pins and the link plates of a silent (link) chain is improved, productivity is improved and associated costs are reduced.

7 Claims, 6 Drawing Sheets

LINK CHAIN

CROSS REFERENCE TO RELATED APPLICATIONS

This application claims foreign priority under Title 35, United States Code §119(a)-(d) of PCT Patent Application No. PCT/JP2007/68825, filed on Sep. 27, 2007 in the Japan Patent Office, the disclosure of which is herein incorporated by reference in its entirety.

BACKGROUND OF THE INVENTION

1. Field of the Invention

The present invention relates to a link chain such as a silent chain and a leaf chain in which a plurality of link plates is linked by pins and more specifically to a link chain in which bushes are fitted into the link plates turning relatively with the pins.

2. Related Art

Generally, there is a silent chain that is composed of endlessly linked toothed link plates by pins and is used as a chain for transmitting power and a leaf chain that is composed of link plates having no teeth and linked straightly by pins and is used as a chain for lifting or drawing a heavy load.

Lately, the applicant of the present invention has proposed a link chain composed of pins on the surface of which a metal carbide layer formed of at least one of chrome, vanadium, niobium, titanium, zirconium, tantalum, molybdenum and tungsten is provided by means of cementation and having Vickers hardness of 1300 Hv or more is coated by 5 μm or more and link plates formed of carbon steel or alloy steel containing carbon in a range of 0.30 to 0.55 wt % or as a base material and on the surface of which a metal carbide layer formed of at least one of chrome, vanadium, niobium, titanium, zirconium, tantalum, molybdenum and tungsten is provided by means of cementation and having Vickers hardness of 1300 Hv or more is coated by 3 μm or more (see Japanese Patent Application Laid-open No. 2000-249196 Gazette).

There has also been devised a silent chain in which bushes are fitted into link plates that turn relatively with pins (see Japanese Patent Application Laid-open Nos. Hei. 7-151192 and 2002-250405 Gazettes).

While it is possible to reduce wear of pins and pinholes and to reduce elongation of the chain because the surface of the link plates of the silent chain of JPA No. 2000-249196 is coated with the metal carbide layer whose hardness is high similarly to the surface of the pins, there is a drawback that because the whole surface of the link plate is hardened, the surface of teeth of a sprocket and a tensioner (including a tightener and a guide shoe) that slidably contact with the link plates are worn away sooner.

Due to that, while it is also proposed to remove the surface of metal carbide layer of the link plate engaging with the surface of the teeth of the sprocket and/or the part thereof slidably contacting with the tensioner, a long processing time of 50 to 100 hours is required to remove the metal carbide layer of the engaging tooth flank and the back surface of the link plate by barreling. Still more, because corners of the link plate are also polished and rounded because the whole outer side surface is polished, an effective flat surface of an edge of the link plate that engages with the sprocket or slidably contacts with the tensioner is considerably reduced. Due to that, there is a possibility that it may cause quick wear and noise of the sprocket and the tensioner and may generate pitching (micro-fatigue spalling) of the surface of teeth of the sprocket.

Although it is possible to remove the metal carbide layer by grinding the surface of the link plate engaging with the sprocket or the back thereof, it is required to precisely control the grinding size of all of the link plates to keep precise engagement of the large number of link plates with the surface of the teeth of the sprocket in this case, thus considerably increasing an associated cost.

Still more, while a large amount of diffusion metalizing material, e.g., metal powder of chrome, to coat the metal carbide layer over the whole link plate, these carbide-forming metals are expensive and increase associated costs.

Further, while punching by a press is carried out in forming the pin holes through the link plate, the whole hole surface does not become a sheared surface and part thereof becomes a fracture surface. As a consequence, a diameter of the pin hole on the side of the sheared surface becomes different from that on the side of the fracture surface and a contact area of the pin hole with the pin becomes small, so as to provide a cause of the quick elongation of the chain.

Meanwhile, while the silent chain in which bushes are fitted into bush (pin) holes of link plates is also known as shown in Japanese Patent Application Laid-open No. Hei. 7-151192, the bush is formed by rolling a steel plate and after rolling, carburizing, quenching and tempering are carried out to harden the surface. However, strain is prone to be generated at a seaming part of the bush in rolling and it is difficult to obtain enough roundness. Still more, even if the hardness of the bush described above is adequate for the carburized and quenched pin, the hardness of the carburized and quenched bush is not enough for the pin on which the metal carbide layer is coated. Such bush wears relatively quickly and may cause elongation of the chain.

Still more, although a link chain in which a bush is formed as a solid type bush having no seam in the longitudinal direction is also proposed as disclosed in Japanese Patent Application Laid-open No. 2002-250405, the bush is also formed of alloy case-hardening steel and does not have enough hardness relative to the pin coated with the metal carbide. It is noted that a part of the link plate between the bush (pin) hole and the outer edge surface is prone to be a fracture surface by receiving a large shearing force from the pin in the silent chain and due to that, the silent chain of Japanese Patent Application Laid-open No. 2002-250405 links two link plates by a solid bush to assure predetermined strength.

Further, although it is necessary to thin the bush and to assure a predetermined distance between the bush hole and the outer edge surface of the link plate to keep a predetermined tensile strength of the link plate in fitting the bush into one link plate, it is considered to be difficult to carry out deep drawing for forming the thin bush by the carbon steel or alloy steel containing carbon in high concentration of 0.30 to 0.55 wt % that is required to generate the metal carbide layer in general.

SUMMARY OF THE INVENTION

Accordingly, the present invention aims at solving the aforementioned problems by providing a link chain in which a bush that is coated with a metal carbide layer similarly to a pin is fitted into a link plate that turns relatively with the pin.

The invention provides a link chain composed of a large number of link plates linked by pins in width and longitudinal directions of the chain, wherein the link plates include link plates each of which has a pair of holes for fitting bushes through which the pins are inserted;

the surface of the pin is coated by a metal carbide formed of at least one of chrome, vanadium, niobium, titanium, zirconium, tantalum, molybdenum and tungsten by means of cementation and having Vickers hardness of 1300 Hv or more; and the bush is molded into a seamless cylindrical shape by cold-forging carbon steel or alloy steel containing carbon by 0.2 wt % or more, and is coated with a metal carbide formed of at least one of chrome, vanadium, niobium, titanium, zirconium, tantalum, molybdenum and tungsten by means of cementation and having Vickers hardness of 1300 Hv or more and is treated further by a quenching, tempering or isothermal transformation process.

It is noted that the cylindrical shape of the bush here means not only that having equal inner and outer diameters across the whole length of the bush but also that having a tapered outer diameter.

Thus, the bush is fitted into the hole of the link plate and is coated also with the metal carbide formed by the cementation similarly to the pin. Accordingly, even though the bearing parts of the pin and the bush where they relatively turn are composed of the metal carbide whose hardness is high (whose Vickers hardness is 1300 Hv or more), thus reducing their wear and the elongation of the chain, the link plate itself is composed of a normal material such as quenched carbon steel and the like so that it is possible to reduce quick wear of the members contacting with the chain such as tooth surfaces of a sprocket and a tensioner and to prolong the life of the whole system.

Still more, because the metal cementation of chrome, vanadium and others is implemented only on the pin and the bush, it is not necessary to use a large amount of the expensive carbide forming metal and to carry out a post-processing such as barreling and grinding that are cumbersome and take a long time. Thus, the cost may be further reduced.

Still more, the bush is molded into the seamless shape by cold-forging and enough roundness may be obtained, so that the bush may be formed to be relatively thin, holds wear resistant performance and provides enough mechanical performance such as tensile strength of the chain.

Still more, although the bush is put into an annealed state by the metal cementation, the bush can keep enough rigidity of the base material by implementing the quenching, tempering or isothermal transformation process.

Preferably, the bush is carburized in the state in which the steel containing carbon by 0.35 wt % or less is molded into the cylindrical shape by the cold-forging and is then coated with the metal carbide by the cementation.

Thereby, while the bush may be molded readily in high precision because the steel containing the relatively low amount of carbon of 0.2 to 0.35 wt % is used, an amount of carbon required in the cementation in forming the metal carbide layer may be assured because the metal carbide layer is formed by the cementation after carburizing the bush in that state and a required amount of carbon for the quenching, tempering or isothermal transformation process carried out after that may be also assured.

Figure 4A:
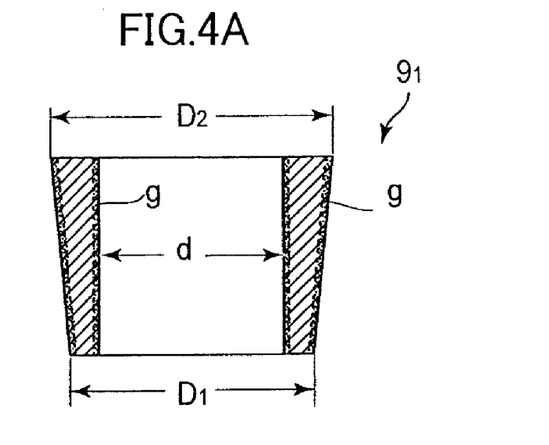
Figure 4B:
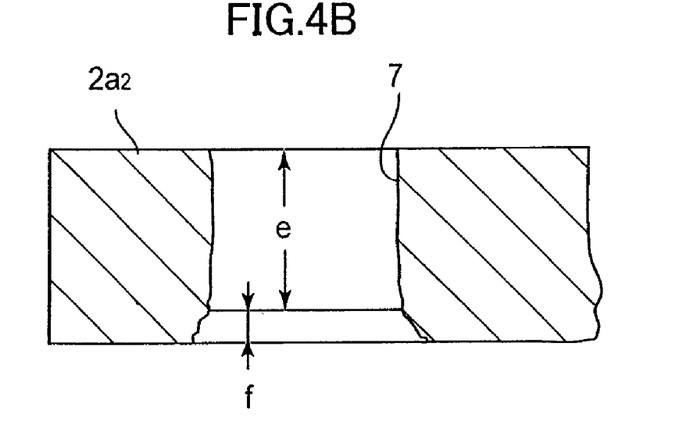
Figure 4C:
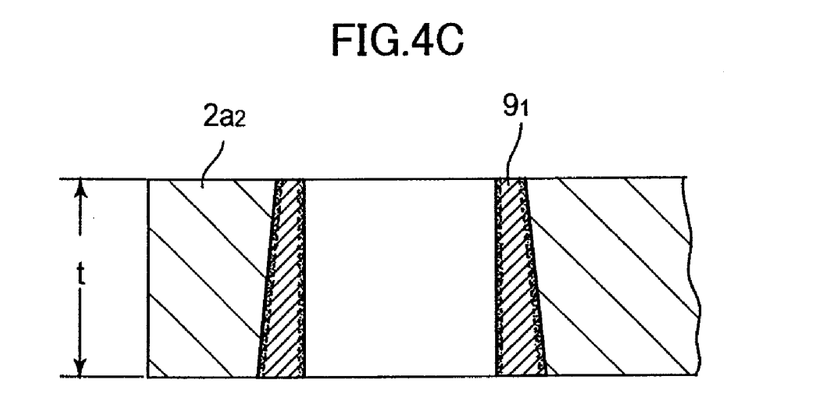

With reference to FIG. 4 for example, a hole for fitting the bush into the link plate is formed by punching by means of a press; the bush is a tapered bush whose inner diameter is equal in the axial direction and whose outer diameter is tapered to be different in the axial direction; and the tapered bush is inserted into the hole formed by punching the link plate from the side where the outer-diameter is small to the side of a fracture surface of the hole so that the tapered bush fits across the fracture and sheared surfaces of the hole.

Thereby, even if a relatively large fracture surface is produced in punching the link plate by the press, the bush may fit readily and accurately across the whole length of the pressed hole by inserting the small-diameter side of the tapered bush from the fracture surface side of the hole. Thus the bush may be rigidly fixed to the pressed hole. Still more, combined with a draft angle in cold-forging, the bush may be thinly formed and may improve its mechanical strength while keeping its wear resistant performance.

Figure 5:
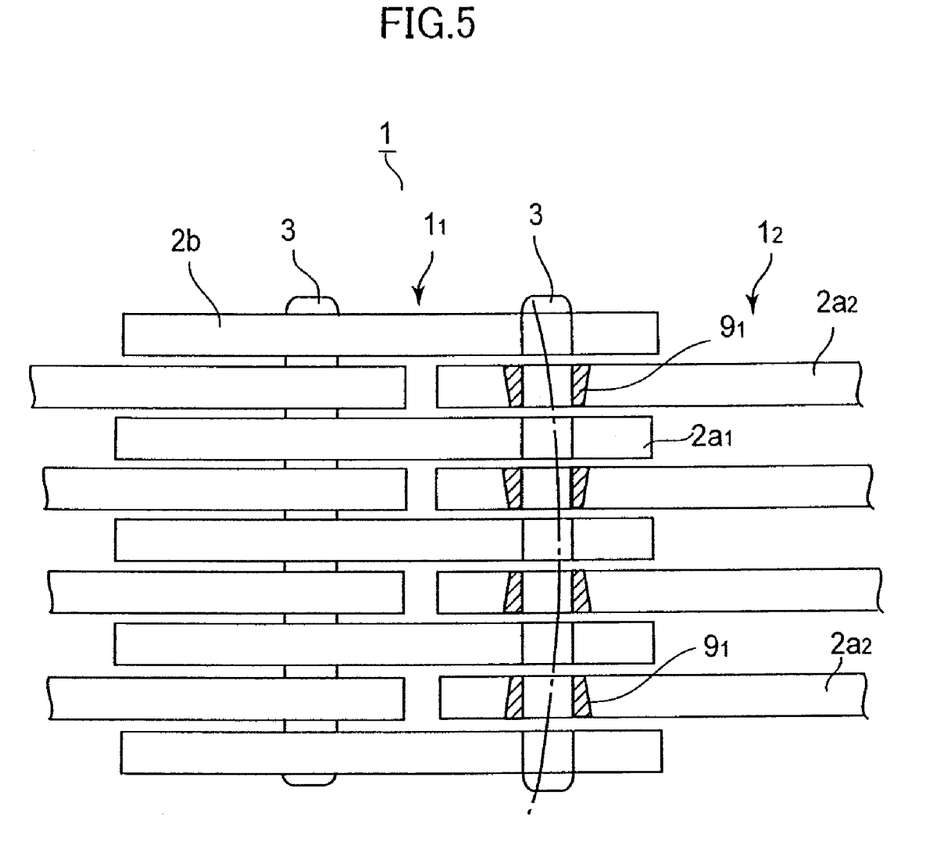
FIG. 5 is a partly sectioned plan view illustrating a silent chain assembled by using the link plates attached with the tapered bushes.

With reference to FIG. 5 for example, the link plate fitted with the tapered bush is arranged so that the small-diameter side of the tapered bush orients to the width-wise center side of the large number of link plates and so that the large-diameter side of the tapered bush orients to the width-wide outer side.

Thus the chain is assembled by arranging the link plates fitted with the tapered bush so that the small-diameter side of the tapered bush orients to the width-wise center side of the chain and so that the large-diameter side orients to the width-wide outer side, so that the limit of wear of the bush may be extended and the wear life of the chain may be prolonged by increasing contact pressure applied between the thick side (large-diameter side) of the bush and the pin even if the pin bends by receiving a large tensile load generated in the chain.

Preferably, the thickness of the metal carbide layer of the pin is 5 μm or more and the thickness of the metal carbide layer of the bush is 3 μm or more.

Thus the thickness of the metal carbide layer of the pin is 5 μm or more and that of the bush is 3 μm or more, so that the limits of wear of the pin and the bush may be equalized and harmonized and the wear life of the chain may be improved.

Preferably, the width-wise dimension of the bush is set to be equal to or to be slightly smaller than the thickness of the link plate fitted with the bush.

Thereby, because the bush does not project out of the surface of the link plate, it is possible to prevent lubricant oil from not being supplied to the bearing surface composed of the pin and the bush and by the end surface of the bush that otherwise closely contacts with the neighboring link plate. Thus, while the seamless bush is used, its lubrication is assured and its wear resistance may be kept.

With reference to FIGS. 1, 2, 5 and 6 for example, the link chain includes non-turning link ranks composed of a plurality of link plates disposed in the width direction of the chain in a state not turning relatively with the pin; and turning link ranks composed of a plurality of links disposed in the width direction of the chain while being turnably relatively with the pin;

wherein the bush is fitted only into the link plate of the turning link ranks.

Thus, the bush is pressed only into the link plate of the turning link rank that turns relatively with the pin, so that the cost may be cut more by suppressing a number of link plates fitted with the bush while keeping enough wear resistant performance.

Figure 6:
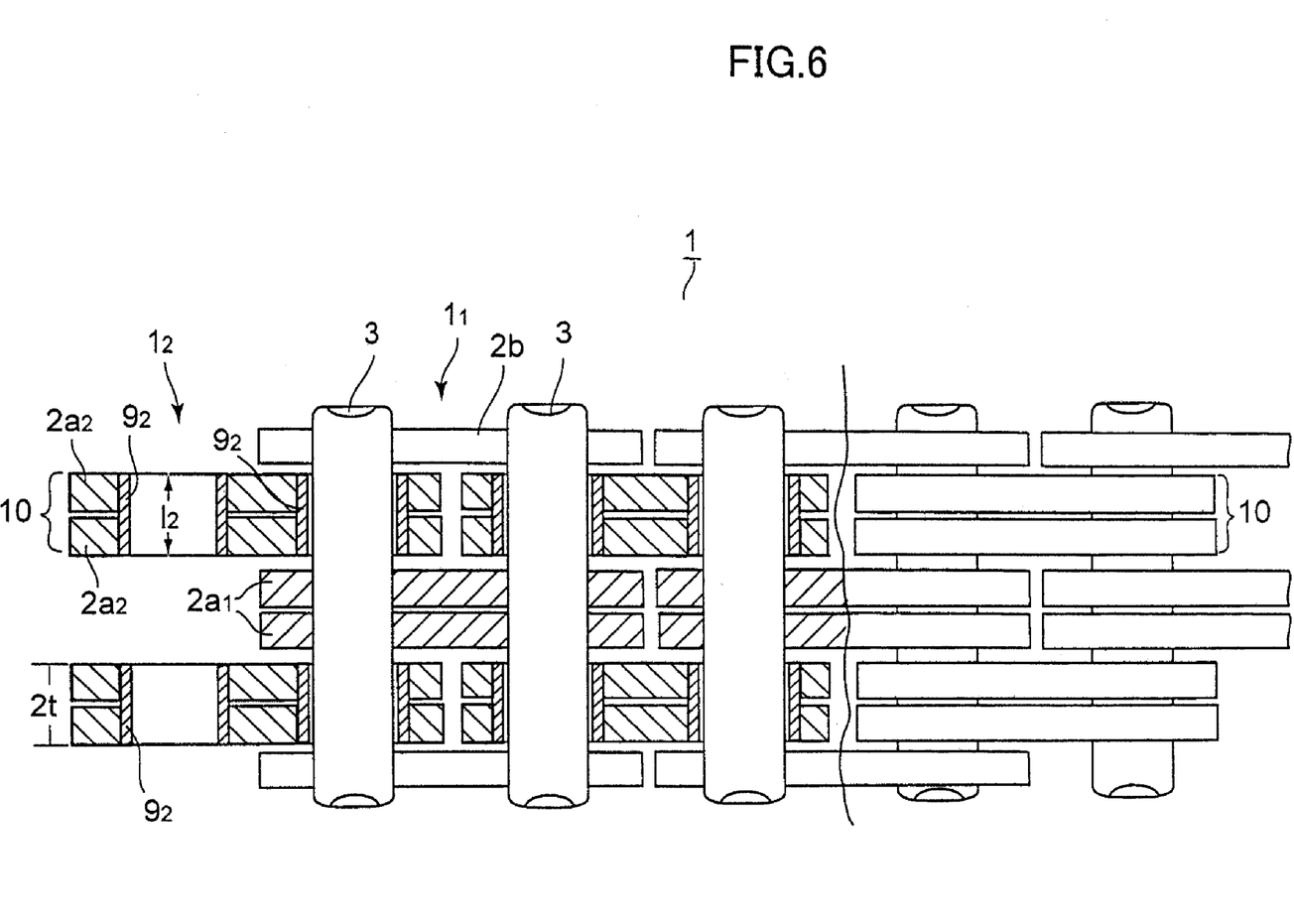
FIG. 6 is a partly sectioned plan view illustrating a silent chain according to another embodiment of the invention.

With reference to FIG. 6 for example, the plurality of neighboring link plates in the turning link ranks are disposed while being bundled; and the bush is fitted into the bundled link plates in common and a width-wise dimension of the bush is set to be equal to or to be slightly smaller than the total thickness of the bundled link plates.

Thus the set of link plates is composed of the plurality of bundled link plates into which the bush is pressed in common, so that assembly of the chain may be improved while keeping the mechanical strength and the wear resistance. It is possible to prevent the lubrication from becoming inferior by the ends of the bush that otherwise closely contact with the surface of the neighboring link plate also when the link plates are bundled.

The above and other advantages of the invention will become more apparent in the following description and the accompanying drawings in which like numerals refer to like parts.

BRIEF DESCRIPTION OF DRAWINGS

FIGS. 3A and 3B show a bush, wherein FIG. 3A is a plan-section view thereof and FIG. 3B is a front-section view thereof;

FIGS. 4A, 4B and 4C show a partly modified embodiment, wherein FIG. 4A is a plan-section view of a tapered bush, FIG. 4B is a plan-section view of a bush hole of the link plate and FIG. 4C is a plan-section view showing a state in which the tapered bush is pressed into the bush hole;

BEST MODE FOR CARRYING OUT THE INVENTION

Figure 1A:
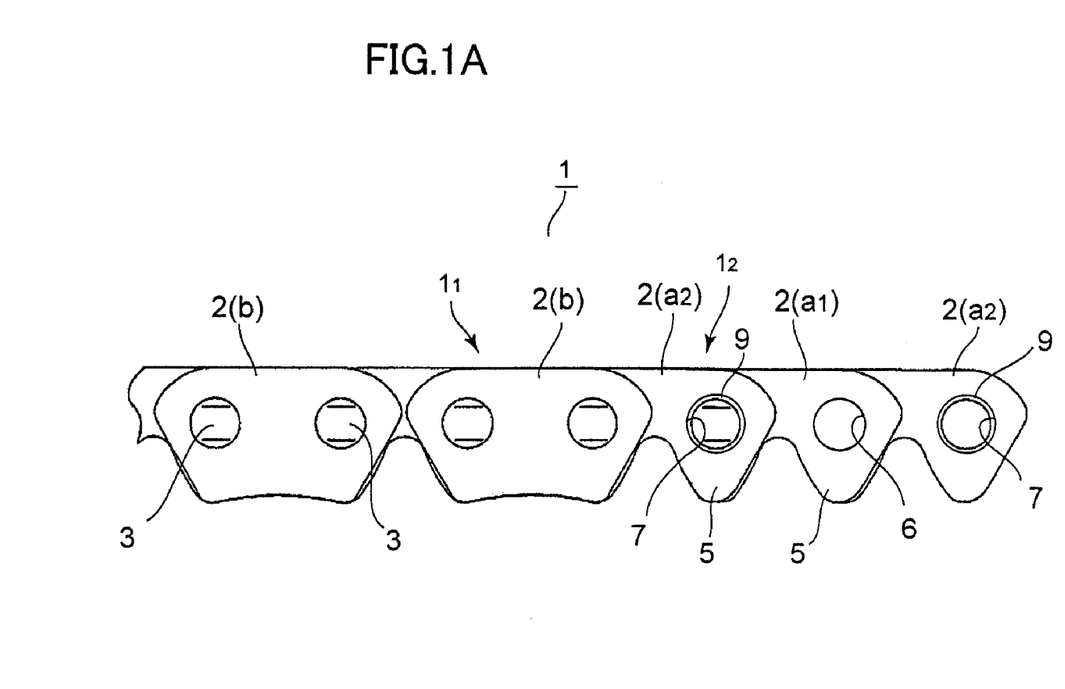
FIG. 1A is a front view of a silent chain to which the invention is applied and FIG. 1B is a front view of a link plate of a non-guide train (turning link rank) thereof.
Figure 1B:
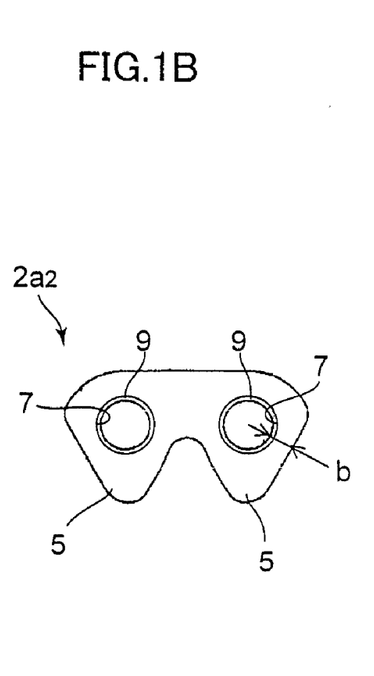
Figure 2:
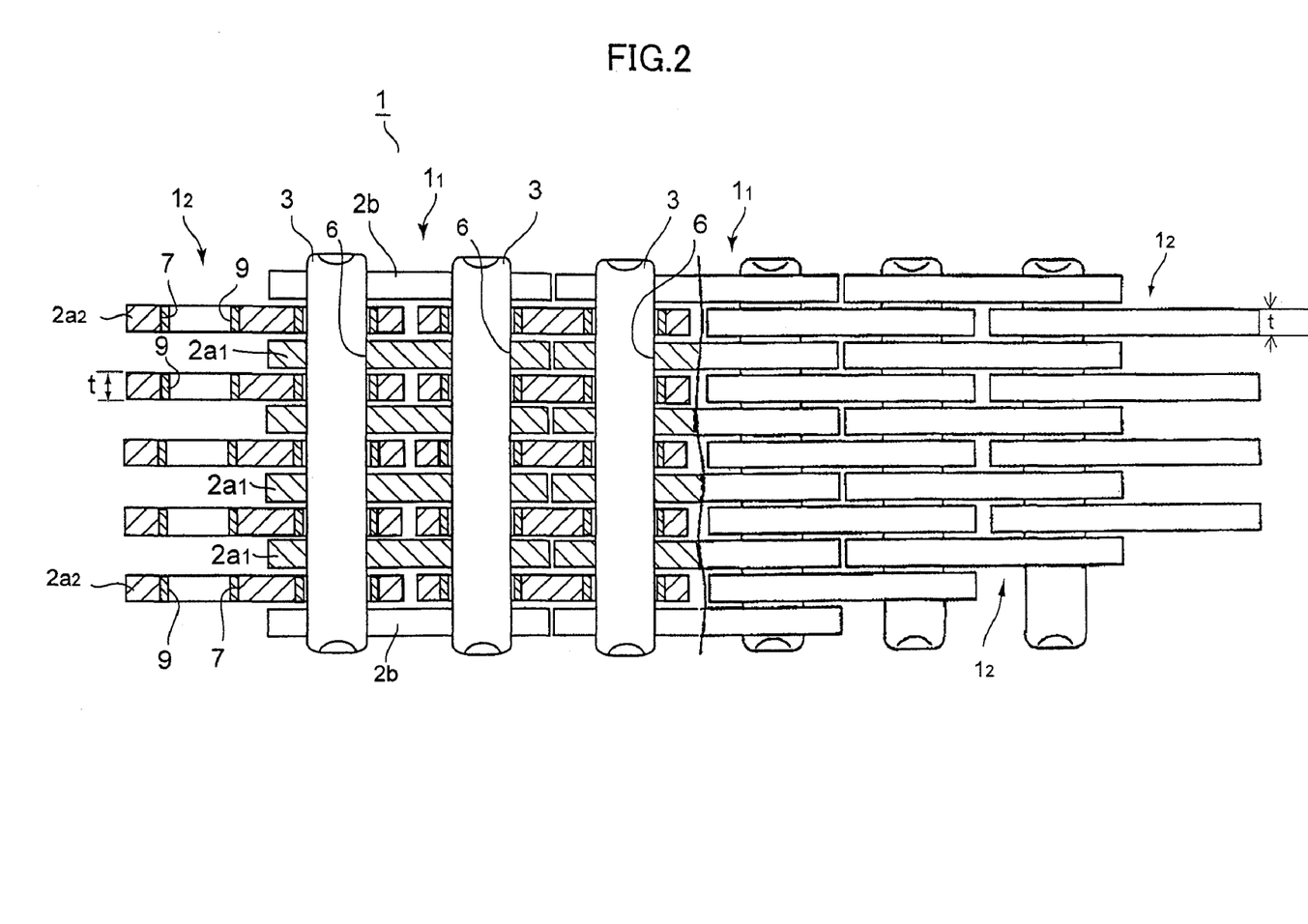
FIG. 2 is a plan view of the silent chain whose one end is shown in section.

An embodiment of the present invention will be explained below with reference with reference to the drawings. While there are a silent chain, a leaf chain and others as a link chain in which a large number of link plates are linked by pins, the silent chain will be explained below as the embodiment of the invention. As shown in FIGS. 1 and 2, the silent chain 1 is composed of a large number of link plates 2 alternately linked by pins 3 endlessly. The link plates include link plates 2a having teeth 5 and guide link plates 2b having no teeth.

Still more, the pin 3 is fixed to the guide link plate 2b by caulking. Guide link ranks (non-turning link ranks) $1_1$ in the same rank with the guide link plate in the width direction of the chain and non-guide link ranks (turning link ranks) $1_2$ having no guide link plate are alternately linked by the pins 3. In the present embodiment, the guide link rank $1_1$ is composed of six link plates including the guide link plates 2b and the non-guide link rank $1_2$ is composed of five link plates. Then, the link plates $2a_1$ in the guide link rank (non-turning link rank) $1_1$ do not turn relatively with the pin 3 and the link plates $2a_2$ of the non-guide link rank (turning link rank) turn relatively with the pin 3. Thus, the chain 1 bends freely.

In the present embodiment, different link plates are used for the link plates $2a_1$ of the guide link rank and for the link plates $2a_2$ of the non-guide link rank even though they are the similar toothed link plates 2a. Pin holes 6 whose diameter is substantially the same with that of the pin 3 are formed through at both ends of each link plate $2a_1$ of the guide link rank. Bush holes 7 whose diameter is larger than that of the pin by a predetermined size are formed through at both ends of each non-guide link plate $2a_2$ and bushes 9 are press-fitted and fixed to the bush holes.

The link plates $2a_1$, $2a_2$ and 2b of the guide link ranks $1_1$ and the non-guide link ranks $1_2$ are formed by punching a rolled carbon steel (band steel or flat steel) by a press and by drilling the pin hole 6 or the bush hole 7 in high precision after chamfering and drilling a pilot hole. Then, ordinary heat treatments of quenching and tempering are carried out. The bush 9 is pressed into the bush hole 7 of the link plate $2a_2$ of the non-guide link rank.

Figure 3A:
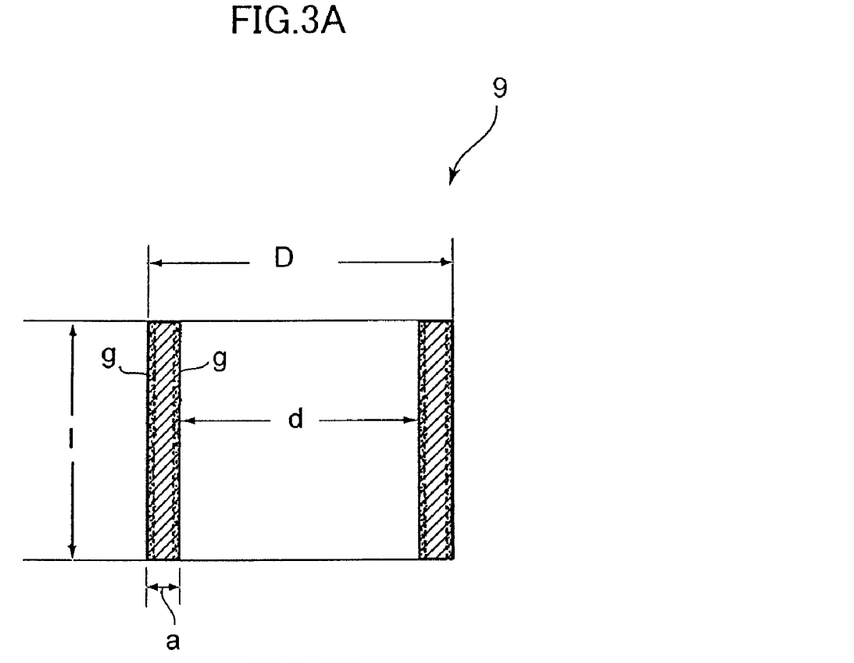
Figure 3B:
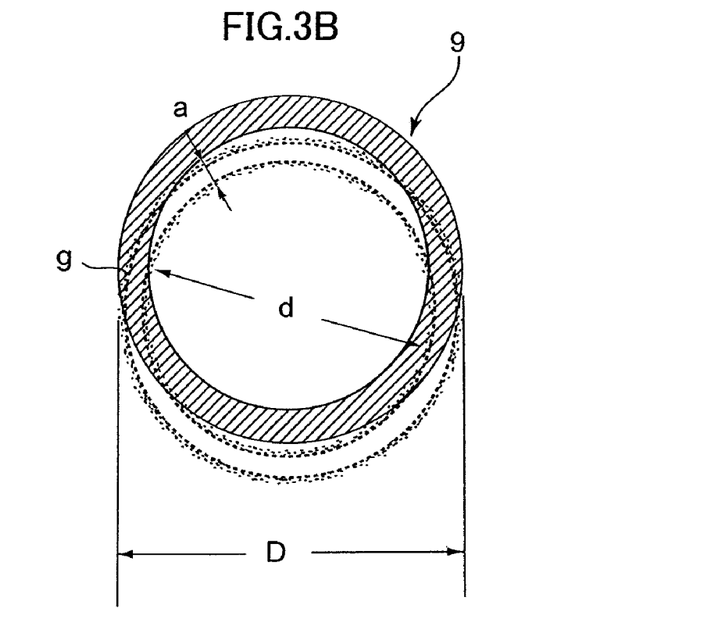

The bush 9 is formed into a seamless cylinder having an inner diameter d and an outer diameter D as shown in FIG. 3. The inner diameter d is set to be slightly larger than the outer diameter of the pin 3, so that the pin 3 fits turnably into the bush 9. The outer diameter D of the bush 9 is set to be slightly larger than the diameter of the bush hole 7 of the link plate 2 $a_2$ and the bush 9 is pressed into the bush hole 7, so that the bush 9 is fixed in a body to the link plate $2a_2$. A width-wise length l of the bush 9 is set to be equal to a thickness t of the link plate $2a_2$ (l≈t) or to be slightly shorter than the thickness t (l<t) so that ends of the bush 9 do not project out of the side surface of the link plate $2a_2$ when the bush 9 is fixed to the link plate $2a_2$. This arrangement prevents lubricant oil from not being supplied to bearing faces between the bush and the pin by the ends of the bush that otherwise project out of the surface of the link plate and closely contact with the surface of the neighboring link plate. It is noted that the bush 9 shown in FIG. 3 is formed into the cylindrical shape having the inner diameter d and the outer diameter D which are equal along the length of the chain l.

The bush 9 is molded by cold-forging by using carbon steel or alloy steel containing carbon C by 0.2 wt % or more as the base material. That is, the bush 9 is formed by extruding a rod-like material into a shape of hollow cylinder or cup by a press and then by cutting a rear edge surface thereof into a seamless cylindrical shape. The thickness (a=(D−d)/2) of the bush 9 is preferably equal along the whole circumference and is provided to be thin within a range having strength bearable to press-fitting. It is because it is necessary to keep predetermined tensile strength against a tensile load of the link plate $2a_1$ by assuring a fracture-bearing length b (see FIG. 1B) between the bush hole 7 and the edge surface of the link plate.

The surface (outer and inner surfaces) of the bush 9 molded by the cold-forging described above is coated with a metal carbide layer g of at least one of chrome Cr, vanadium V, niobium Nb, titanium Ti, zirconium Zr, tantalum Ta, molybdenum Mo and tungsten W by a metal cementation such as a chrome diffusion metalizing and vanadium diffusion metalizing by at least 3 μm or more Vickers hardness of the surface is set at 1300 Hv or more. It is noted that the metal carbide layer on the surface of the bush may be one type of metal carbide layer or may be a plurality of metal carbides such as $(V, Cr)_8C_7$ diffused by carrying out the vanadium diffusion metalizing by using a Cr-rich steel material. The metal carbide layer may also be compound metal carbide such as those of Cr and Ni, Cr and Mo and others for example.

The quenching, tempering or isothermal transformation process is implemented on the bush 9 after coating the surface thereof with the metal carbide layer. Because the bush 9 that is treated at a high temperature of around 800° C. or more in the metal cementation described above is cooled slowly, the base material is put into an annealing state and its rigidity drops. Due to that, the quenching, tempering or isothermal transformation process is carried out again to strengthen the bush. It is noted that although it is preferable to carry out the quenching and tempering process of the bush on the bush alone and to press-fit and fix the bush into the link plate after that, the quenching, tempering or isothermal transformation process may be carried out together with the link plate after fixing the bush into the link plate.

Still more, the carburizing process may be carried out on the cold-forged bush before carrying out the metal cementation.

The content of carbon C in the material of the bush 9 is set at 0.20 wt % or more because the carbon is consumed to form a carbide layer during the metal cementation even if the carburizing treatment is carried out and the amount of carbon C in the base material becomes less than 0.20 wt % and the quenching is prone to become incomplete. Meanwhile, the content of carbon is preferably less for the cold-forging of the bush. Experimentally, the material must contain 0.35 wt % of carbon C in order to coat the carbide layer of Cr, V and others by 3 μm or more and the material containing carbon C by less than 0.35 wt % requires the carburizing treatment and the material whose carbon content is more than that does not always require the carburizing treatment. Accordingly, it is preferable to carry out the cold-forging of the bush in high workability and precision by using the material whose carbon content is 0.20 to 0.35 wt % and after carburizing in this state, to carry out the metal cementation and then the quenching, tempering and other treatments.

Meanwhile, similarly to the bush 9 described above, the surface of the pin 3 is coated by metal carbide of at least one of chrome Cr, vanadium V, niobium Nb, titanium Ti, zirconium Zr, tantalum Ta, molybdenum Mo and tungsten W by a diffusion coating so that the surface hardness is 1300 Hv or more of Vickers hardness. As for the coating of the pin by the metal carbide, see Japanese Patent Publication Sho. 52-60422, Japanese Patent Application Laid-open No. Sho. 52-134832 and International Publication (WO) No. 2004/109153 disclosed by the present applicant.

The thickness of the metal carbide layer of the pin 3 is 5 μm or more and the thickness of the metal carbide layer of the bush 9 is 3 μm or more. Thereby, limits of wear of the pin and the bush may be equalized and harmonized.

The silent chain 1 is wound around a driving sprocket and a driven sprocket and while being prevented from coming out of the respective sprockets by the guide link plates 2b, teeth 5 of the respective link plates 2a engage with sprocket teeth to transmit power. At this time, while the guide link rank $1_1$ and the non-guide link rank $1_2$ bend from each other centering on the pin 3, the guide link plate 2b is fixed with the pin 3 and the pin hole 6 of the link plate 2a$_1$ fits with the pin 3, so that they turn in a body without sliding relatively from each other.

Meanwhile, while the link plate 2a$_2$ of the non-guide link rank $1_2$ turns relatively with the pin 3 and the outer surface of the pin 3 and the inner surface of the bush 9 become bearing surfaces and slide while receiving large tensile load, the both surfaces are coated by the metal carbide and has the Vickers hardness of 1300 Hv or more, so that the bearing surfaces slide smoothly without quickly wearing. Still more, the bush 9 has the seamless high-precision cylindrical inner surface by cold-forging, so that the bush 9 contacts with the pin 3 in the axial direction across substantially the whole length thereof and wears less because a state close to a total contact state is brought about. Thereby, the silent chain 1 has predetermined tensile strength and can transmit relatively large power and its wear and elongation resistant performance may be considerably improved.

Next, a partly modified embodiment will be explained with reference to FIGS. 4 and 5. When the bush hole 7 (and the pin hole 6) is formed through the link plate 2a by punching of the press, it is difficult to form the bush hole 7 as a sheared surface e across the whole length thereof and part thereof is formed as a fracture surface f in general. Due to that, the diameter of the fracture surface part f becomes larger than that of the sheared surface part e if the pinhole formed by the punching of the press is left as it is. It is difficult to contact the pin hole totally with the pin 3 across the whole length of the hole and it may cause the wear and elongation of the chain. Although it is possible to absorb the dimension error caused by the fracture surface f described above by using the cylindrical bush 9 shown in FIG. 3 for an ordinary hole formed by pressing, there is a case when the error cannot be absorbed by the cylindrical bush 9 that is formed to be thin as much as possible depending on the material and thickness of the link plate.

Then, a tapered bush 9$_1$ whose outer surface is tapered as shown in FIG. 4A is used in the present embodiment. While an inner diameter of the tapered bush 9$_1$ is constant and the same size d with that of the cylindrical bush described above, its outer diameter of one end is small ($D_1$) and gradually expands toward the other end ($D_2$) ($D_1 < D_2$). It is noted that the material and manufacturing method of this bush are the same with those of the cylindrical bush described above. That is, this bush is also formed into a seamless cylindrical shape by cold-forging, is coated with the metal carbide g by cementation on the surface thereof and is treated by the quenching, tempering or isothermal transformation process.

The tapered bush 9$_1$ has a draft angle in the cold-forging, so that its productivity is improved. It is noted that although the taper is exaggerated in the figure by increasing the thickness, the tapered angle is actually very small and the difference of the thickness of the upper and lower ends ($D_2 - D_1$) is also very small.

Then, the tapered bush 9$_1$ is pressed into and fixed to the bush hole 7 in the link plate 2a$_2$ as shown in FIG. 4C by inserting the end on the side where the diameter is small ($D_1$) from the side of the fracture surface f where the diameter is large. Thereby, the tapered bush 9$_1$ may be readily pressed into and fixed to the bush hole 7 of the link plate 2a$_2$ without being deformed so much. Thus, the thickness of the tapered bush 9$_1$ may be thinned and the tapered bush 9$_1$ closely adheres and is fixed rigidly to the bush hole across the whole length (thickness t) of the bush hole.

FIG. 5 shows a preferable method for assembling the link plate 2a$_2$ attached with the tapered bush 9$_1$ described above. That is, the link plates 2a$_2$ of the non-guide link rank $1_2$ are assembled alternately with the link plates 2a$_1$ of the guide link rank $1_2$ so that the small-diameter side of the respective tapered bushes 9$_1$ orients to the width-wise center of the chain 1 and the large-diameter side orients to the width-wise outer side.

Thereby, even if the pin 3 bends as indicated by a chain line in the figure by receiving a large tensile force acting on the silent chain 1 during its use or acting as a preload, a large load acts more on the inside, as compared to the outside, of the thickness of the link plate 2a$_1$ or 2a$_2$ in the width direction of the chain and the tapered bush 9$_1$ wears more at the large-diameter side where the thickness is thick by receiving a large contact pressure with the pin 3. Accordingly, it is possible to prolong limits of wear, to reduce the elongation of the chain caused by the wear and to improve the life of the chain even if the thin bush is used.

FIG. 6 shows another embodiment of the silent chain 1. In this silent chain 1, the link plates 2a$_2$ of the non-guide link rank $1_2$ and the link plates 2a$_1$ of the guide link rank $1_1$ are disposed while the plurality (two in the present embodiment) of neighboring link plates being bundled. One bush 9$_2$ is fitted into the bundled link plates 2a$_2$ of the non-guide link rank $1_2$ in common, thus composing one set of link plates 10. At this time, a length $l_2$ of the bush 9$_2$ is set to be substantially equal to the total thickness of the two bundled link plates 2a$_2$ ($l_2 \approx 2t$) or to be smaller than that ($l_2 < 2t$) so that the end of the bush does not project out of the surface of the link plate.

It is noted that the invention is not limited to the embodiment described above and one in which the bushes 9 and 9$_1$ are pressed into the link plates 2a$_2$, respectively, may be used by bundling the plurality of neighboring link plates. Still more, the link plate using the tapered bush $9_1$ may not be always assembled as shown in FIG. 5 and may be disposed at random. Further, the link plate attached with the cylindrical bush 9 and the link plate attached with the tapered bush $9_1$ may be disposed while appropriately combining them by disposing the link plate using the tapered bush $9_1$ on the outside in the width direction of the chain and by disposing the link plate using the cylindrical bush 9 on the center side.

INDUSTRIAL APPLICABILITY

While the link chain of the invention may be used as a silent chain and a leaf chain, the silent chain is used solely for transmitting power and is suitable as a timing chain of a vehicular engine and the leaf chain is used solely for lifting or drawing a heavy load.

What is claimed is:

1. A link chain comprising:
   non-turning link ranks each having a plurality of first link plates each disposed in a width direction of said link chain and having a pair of pinholes;
   turning link ranks each having a plurality of second link plates each disposed in the width direction of said link chain and having a pair of bush holes;
   a bush disposed within each of the bush holes;
   pins linking said non-turning link ranks with said turning link ranks alternately by being inserted into the pinholes of said first link plates and the bushes of said second link plates;
   each first link plate not turning relatively with respect to each pin linking a respective non-turning rank with a respective turning rank so as to be fixed with respect to the pin thereby so linking the respective ranks;
   each second link plate being turnable relatively with respect to each pin linking a respective non-turning rank with a respective turning rank;
   a surface of each of said pins is coated by a metal carbide formed of at least one of chrome, vanadium, niobium, titanium, zirconium, tantalum, molybdenum and tungsten by means of cementation and having Vickers hardness of 1300 Hv or more; and
   each bush is molded into a seamless cylindrical shape by cold-forging carbon steel or alloy steel containing carbon by 0.2 wt % or more, is coated with a metal carbide formed of at least one of chrome, vanadium, niobium, titanium, zirconium, tantalum, molybdenum and tungsten by means of cementation and having Vickers hardness of 1300 Hv or more and is treated further by a quenching, tempering or isothermal transformation process.

2. The link chain according to claim 1, wherein said bush is carburized in the state in which the steel containing carbon by 0.35 wt % or less is molded into the cylindrical shape by the cold-forging and is then coated with the metal carbide by cementation.

3. The link chain according to claim 1 or 2, wherein each bush hole for fitting said bush into said second link plate is formed by punching by a press;
   said bush is a tapered bush whose inner diameter is equal in the axial direction and whose outer diameter is different in the axial direction; and
   said tapered bush is inserted into the bush hole formed by punching through said second link plate from the side where the outer-diameter is small to a fracture surface side of the bush hole so that said tapered bush fits said bush hole across the fracture and sheared surfaces of said bush hole.

4. The link chain according to claim 3, wherein said second link plate fitted with said tapered bush is arranged so that the small-diameter side of said tapered bush orients to the width-wise center side of said link chain and so that the large-diameter side of said tapered bush orients to the width-wise outer side of said link chain.

5. The link chain according to claim 1, wherein the thickness of the metal carbide layer of said pin is 5 μm or more and the thickness of the metal carbide layer of said bush is 3 μm or more.

6. The link chain according to claim 1, wherein the width-wise dimension of said bush is set to be equal to or to be slightly smaller than the thickness of said second link plate fitted with said bush.

7. The link chain according to claim 1,
   wherein each turning link rank comprises a bundle of second link plates comprising a plurality of second link plates arranged adjacently with respect to each other; and
   a single respective bush is fitted into said respective bush holes of each of said pair of said bundle of said second link plates and a width-wise dimension of the bush is set to be equal to or slightly smaller than a total thickness of said pair of second link plates comprising said bundle of second link plates.

* * * * *